W. A. GATES.
Cotton-Planter.
No. 9,403. Patented Nov. 16, 1852.
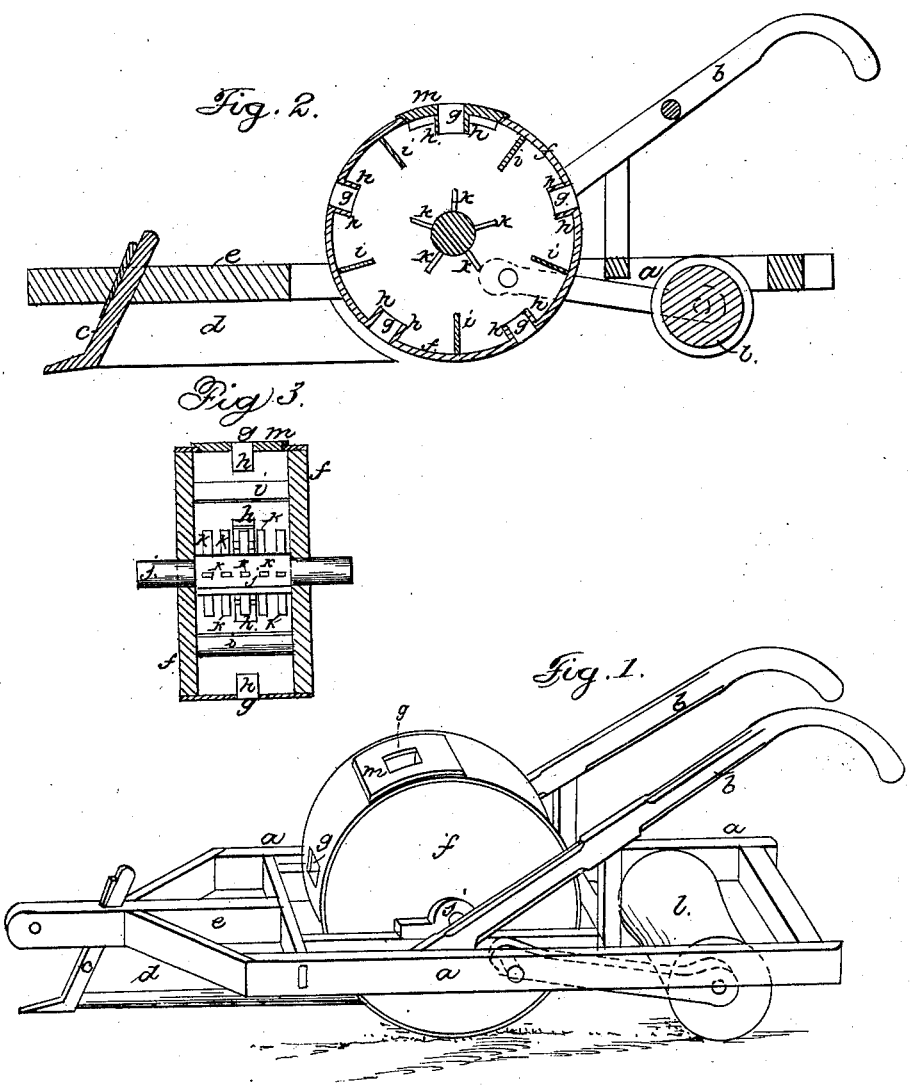

UNITED STATES PATENT OFFICE.

WM. A. GATES, OF MOUNT COMFORT, TENNESSEE.

IMPROVEMENT IN COTTON-SEED PLANTERS.

Specification forming part of Letters Patent No. 9,403, dated November 16, 1852.

*To all whom it may concern:*

Be it known that I, WILLIAM A. GATES, of Mount Comfort, in the county of Fayette and State of Tennessee, have invented a new and useful Machine for Planting Cotton-Seed; and I do hereby declare the following to be a full and clear description thereof, reference being had to the accompanying drawings and letters of reference marked thereon, forming part of this specification, in which—

Figure 1 is a perspective view, showing the external appearance and construction of the machine. Fig. 2 is a longitudinal section thereof. Fig. 3 is a transverse section of the seed-cylinder.

The same letters on the above figures refer to like parts.

The object of my improvement is to enable the planting of cotton-seed to be done by mechanical means by a provision for disentangling or separating the seeds from each other immediately previous to their disposition in the furrow.

$a$ is the frame-work, of wood or other material.

$b$ are the handles.

$c$ is a share or colter for the purpose of opening up a furrow to receive the seed. The tongue or board $d$, projecting down from a front central beam, $e$, to which the colter $c$ is attached, is for the purpose of keeping open and smoothing and breaking the clods of the furrow, and is for this purpose sharpened at its lower edge, and extends nearly as far down as the colter-point and reaches horizontally from immediately behind the colter to a little in front of the lowest part of the seed box or cylinder. This box is a hollow cylindrical drum, $f$, of considerably greater diameter than its length. It may be formed with wooden heads encircled with sheet-iron. At regular intervals around the perimeter of this box $f$ are apertures $g$, made by bending down portions of the metallic sheeting of which the convex portion is composed. These portions so bent down constitute projecting edges or wings $h\ h$, against which the seed falling during the revolution of the cylinder is disentangled and separated and reduced to a fit condition to drop separately or by two through the apertures $g$ into the furrow.

In order still further to assist the separating process, I place between the apertures $g$ ribs of sheet metal $i$ at regular intervals against the concave of the box $f$. In addition to the edges or wings $h$ of each aperture and the intermediate plates or ribs $i$ in the concave, there are affixed to the axle $j$ radial fingers or prongs $k$, so as to unite with the ribs $i$ in the concave in disentangling or separating the seeds from each other. These fingers or prongs project from the axle $j$ in parallel lines, having their radial direction coincident with the apertures, and are of a length sufficient to lay hold of the seeds, and thereby agitate and assist in tearing the seeds asunder and allow them to drop singly or in pairs through the apertures or openings $g$.

It will be understood that the great difficulty heretofore experienced in the planting of cotton-seed by machine is that the seeds unite, or adhere, or stick to each other, somewhat like burs, and thereby render the operation of planting troublesome. The nature of my improvements consists in so adapting a machine to separate or disentangle the seeds as they are deposited in the furrow. $l$ is a roller for covering in the seed, and is made to rest by its own weight upon the ground, and, being somewhat concave in its longitudinal section, is calculated to gather the earth toward the middle of its length, and thereby cover in the seed.

$m$ is a lid through which to insert the seed; but in an operative machine I intend to hinge a cap or segment of the cylinder, so as to be opened and closed when required.

The seed box or cylinder is rotated by its contact with the earth, and the speed thereof is regulated according to the speed of the machine.

The draft-team is attached to the central beam, $e$, in the usual manner.

Having thus described my machine for planting cotton-seed, what I claim as my invention, and desire to secure by Letters Patent, is—

In combination with a rotating cylinder or box, $f$, having apertures $g$ in its perimeter, the projecting edges or wings $h\ h$, radial ribs or plates $i$, and projecting fingers or prongs $k$, arranged around the axle $j$, the whole operating to separate or disentangle the seeds to be sown immediately previous to the disposition thereof in the furrow, as set forth.

In testimony whereof I have hereunto signed my name before two subscribing witnesses.

WM. A. GATES.

Witnesses:
 WM. P. ELLIOT,
 LUND WASHINGTON.